(12) United States Patent
Sekiya

(10) Patent No.: US 8,935,047 B2
(45) Date of Patent: Jan. 13, 2015

(54) CONTROL DEVICE FOR DAMPING-FORCE ADJUSTABLE DAMPER

(75) Inventor: Shigenobu Sekiya, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 399 days.

(21) Appl. No.: 12/842,215

(22) Filed: Jul. 23, 2010

(65) Prior Publication Data

US 2011/0022265 A1 Jan. 27, 2011

(30) Foreign Application Priority Data

Jul. 23, 2009 (JP) ................................. 2009-171695

(51) Int. Cl.
| | | |
|---|---|---|
| *B60G 17/0165* | (2006.01) | |
| *B60G 17/018* | (2006.01) | |
| *B60G 17/08* | (2006.01) | |
| *F16F 9/53* | (2006.01) | |

(52) U.S. Cl.
CPC .............. *F16F 9/535* (2013.01); *B60G 17/018* (2013.01); *B60G 17/08* (2013.01); *B60G 2400/0523* (2013.01); *B60G 2400/102* (2013.01); *B60G 2400/104* (2013.01); *B60G 2400/106* (2013.01); *B60G 2400/204* (2013.01); *B60G 2400/252* (2013.01); *B60G 2500/104* (2013.01); *B60G 2600/02* (2013.01); *B60G 2600/12* (2013.01); *B60G 2600/184* (2013.01); *B60G 2600/187* (2013.01); *B60G 2600/60* (2013.01); *B60G 2600/70* (2013.01); *B60G 2600/702* (2013.01); *B60G 2600/82* (2013.01); *B60G 2800/012* (2013.01); *B60G 2800/014* (2013.01); *B60G 2800/162* (2013.01); *B60G 2800/70* (2013.01); *B60G 2800/91* (2013.01)
USPC .............................................. 701/37; 701/38

(58) Field of Classification Search
USPC ............ 701/37, 38; 188/299.1, 378; 267/220, 267/64.21; 280/5.5, 707, 772; 49/343
See application file for complete search history.

(56) References Cited

U.S. PATENT DOCUMENTS

| | | | | |
|---|---|---|---|---|
| 6,260,835 | B1 * | 7/2001 | Angles et al. ................. | 267/220 |
| 7,188,827 | B2 * | 3/2007 | Thomae et al. ............ | 267/64.21 |
| 2003/0141157 | A1 * | 7/2003 | Stiller et al. ............... | 188/299.1 |
| 2005/0098401 | A1 * | 5/2005 | Hamilton et al. ............. | 188/378 |
| 2006/0224285 | A1 * | 10/2006 | Izawa et al. ..................... | 701/37 |

(Continued)

FOREIGN PATENT DOCUMENTS

JP  2008-238921  10/2008

*Primary Examiner* — Tuan C. To
*Assistant Examiner* — Yuri Kan
(74) *Attorney, Agent, or Firm* — Rankin, Hill & Clark LLP

(57) ABSTRACT

A damping-force-adjustable-damper control device includes a target damping force setting unit which sets target damping force, a stroke position detecting unit which detects a stroke position of the damping-force adjustable damper, a stroke speed calculating unit which calculates a stroke speed, and a target output calculating unit which calculates a target output value to be output to the damping-force adjustable damper in accordance with an obtained target damping force and an obtained stroke speed. The control device also includes a processing-period setting unit which sets the processing periods of the stroke speed calculating unit and the target output calculating unit in accordance with a resonant frequency of unsprung mass, and which sets the processing period of the target damping force setting unit to be longer than the processing periods of the stroke speed calculating unit and the target output calculating unit in accordance with a resonant frequency of sprung mass.

6 Claims, 11 Drawing Sheets

(56) References Cited

U.S. PATENT DOCUMENTS

| | | | |
|---|---|---|---|
| 2007/0062119 A1* | 3/2007 | Ritter | 49/343 |
| 2008/0004770 A1* | 1/2008 | Masamura | 701/37 |
| 2008/0004771 A1* | 1/2008 | Masamura | 701/37 |
| 2008/0140285 A1* | 6/2008 | Sekiya | 701/38 |
| 2009/0043452 A1 | 2/2009 | Sekiya | |
| 2011/0022265 A1* | 1/2011 | Sekiya | 701/37 |

* cited by examiner

|  | PROCESSING PERIOD | | PROCESSING TIME | |
| --- | --- | --- | --- | --- |
|  | PRIOR ART | EMBODIMENT | PRIOR ART | EMBODIMENT |
| DETECTING VEHICLE MOTION | 2ms | 5ms | 1 | 0.4 |
| CALCULATING TARGET DAMPING FORCE Ft | 2ms | 5ms | 1 | 0.4 |
| CALCULATING TARGET CURRENT It | 2ms | 0.5ms | 1 | 4 |
| CALCULATING STROKE SPEED Vs | 2ms | 0.5ms | 1 | 4 |
| DETECTING DAMPER STROKE POSITION | 2ms | 0.125ms | 1 | 16 |

COMPARISON OF DETECTION RESULTS OF
DAMPER-STROKE POSITION WITH/WITHOUT OVERSAMPLING

COMPARISON OF CALCULATION RESULTS OF
STROKE SPEED WITH/WITHOUT OVERSAMPLING

CONTROL DEVICE FOR DAMPING-FORCE ADJUSTABLE DAMPER

CROSS-REFERENCE TO RELATED APPLICATION

The present application claims benefit of the filing date of Japanese Patent Application No. 2009-171695 filed on Jul. 23, 2009 which is incorporated herein by reference.

BACKGROUND OF THE INVENTION

1. Field of the Invention

The present invention relates to a damping-force-adjustable-damper control device which adjustably controls the damping force of a damper that supports a wheel of a vehicle onto a vehicle body.

2. Description of the Related Art

Conventionally, damping-force adjustable dampers are used as a damper for a suspension device of a vehicle.

The damping-force adjustable dampers have a Magneto-Rheological Fluid (MRF) which generates damping force, change the viscosity in accordance with a magnetic field, and is filled in a cylinder. The damping-force adjustable dampers also have a coil arranged in a piston which slides inside the cylinder in the vicinity of a fluid path. As a current is allowed to flow through the coil, the damping-force adjustable damper causes a magnetic field to act on the MRFs flowing through the fluid path of the piston sliding inside the cylinder, and changes the viscosity of the MRFs in the fluid path, thereby obtaining desired damping force.

Regarding the damping-force adjustable dampers, JP 2008-238921 A discloses a configuration of a damper control device which generates a current to a damper in accordance with a target damping force and a detection result by a stroke sensor (see paragraphs 0021, 0022 and FIGS. 6, 7).

As is clear from FIGS. 6, 7 of JP 2008-238921 A, when the target damping force matches a sign of stroke of the damper, a current is set to be a positive value, and when the target damping force does not match the sign of stroke of the damper, the current is set to be zero.

In general, the foregoing setting is made through a periodical processing power by a Central Processing Unit (CPU). That is, a process is executed and a current is output for each period set in accordance with the processing power of the CPU.

SUMMARY OF THE INVENTION

Meanwhile, as is clear from FIG. 6 of JP 2008-238921 A, when a stroke speed is close to zero, the change rate of gain is large, and the change in a target current is also large. Accordingly, when a vehicle runs over successive little bumps (concavities and convexities), if the processing period of the CPU is slow, it is difficult to cause a current output to cope with changes in signs of the target damping force and the sign stroke, so that the damping-force adjustable damper may fail to effectively suppress any vibrations of the vehicle caused by bumps of a road (see FIG. 1).

Accordingly, in order to speed up the processing period of the CPU for the stroke speed, the process speed of the CPU may be speeded up in accordance with the processing period for the stroke speed, but such a speed-up has a limitation.

In conventional technologies, the CPU bears a part to function as, for example, damper motion detecting means for calculating a damper stroke, a vehicle motion detecting means for detecting a motion of the vehicle, a target damping-force calculating means for calculating a target damping force for the damper, and a target current calculating means for calculating a target value of a current caused to flow through the coil of the damper for each 2 ms period in a multitask manner, and a current value of the current caused to flow through the coil of the damper is obtained. This operation means that the foregoing four arithmetic processes are completed within 2 ms, and respective output values are changed for each 2 ms.

When completion of the foregoing four processes within 2 ms is beyond the limit of the process power of the employed CPU, if the period of four arithmetic processes is set to, for example, 0.5 ms in accordance with a detection period of a stroke position of the damper, the CPU cannot cope with such setting because it is out of the maximum process power.

Accordingly, a CPU which has a process power that enables completion of all processes within 0.5 ms becomes requisite, but conventionally, such CPU is expensive in comparison with presently used CPUs, resulting in cost increase.

The present invention has been made in view of the foregoing circumstance, and it is an object of the present invention to provide a damping-force-adjustable-damper control device that can perform more precise damping-force control which does not lead to cost increase.

In order to achieve the above object, a first aspect of the present invention provides a control device for a damping-force adjustable damper, the control device causes relative vibration between a vehicle body and a wheel to attenuate through outputting of a target output, and the control device comprises: a target damping force setting unit which sets a target damping force in accordance with a motional condition of the vehicle body or with a road condition; a stroke position detecting unit which detects a stroke position of the damping-force adjustable damper; a stroke speed calculating unit which calculates a stroke speed in accordance with a stroke position detected by the stroke position detecting unit; a target output calculating unit which calculates a target output value to be output to the damping-force adjustable damper in accordance with the target damping force obtained by the target damping force setting unit and the stroke speed obtained by the stroke speed calculating unit; and a processing-period setting unit which individually sets respective processing periods or detection periods of the target damping force setting unit, the stroke position detecting unit, the stroke speed calculating unit, and the target output calculating unit, wherein the processing-period setting unit sets respective processing periods of the stroke speed calculating unit and the target output calculating unit in accordance with a resonant frequency f unsprung mass, and sets a processing period of the target damping force setting unit to be longer than respective processing periods of the stroke speed calculating unit and the target output calculating unit in accordance with a resonant frequency of sprung mass.

A second aspect of the present invention provides the damping-force-adjustable-damper control device of the first aspect of the present invention, in which the processing-period setting unit may set the detection period of the stroke position of the stroke position detecting unit so that the stroke position detecting unit detects stroke positions for plural times during a period in which the stroke speed calculating unit executes a process.

A third aspect of the present invention provides the damping-force-adjustable-damper control device of the second aspect of the present invention, in which the stroke speed calculating unit may calculate a speed output value based on an average value of plural position output values for plural stroke positions detected by the stroke position detecting unit, during a period in which the stroke speed calculating unit executes a process.

A fourth aspect of the present invention provides the damping-force-adjustable-damper control device of the second aspect of the present invention, in which the stroke speed calculating unit may calculate a speed output value from an average value of plural speed values obtained by performing time-differentiation on plural position output values for plural stroke positions detected by the stroke position detecting unit during a period in which the stroke speed calculating unit executes a process.

DETAILED DESCRIPTION OF THE PREFERRED EMBODIMENT

An explanation will be given of an embodiment of the present invention with reference to the accompanying drawings.

<<Suspension Device 4 for Vehicle 100>>

An explanation will be given of the structure of a suspension device 4 for a four-wheel vehicle 100 equipped with a control device (ECU 7) for a damping-force adjustable damper according to an embodiment with reference to FIG. 1.

Figure 1:
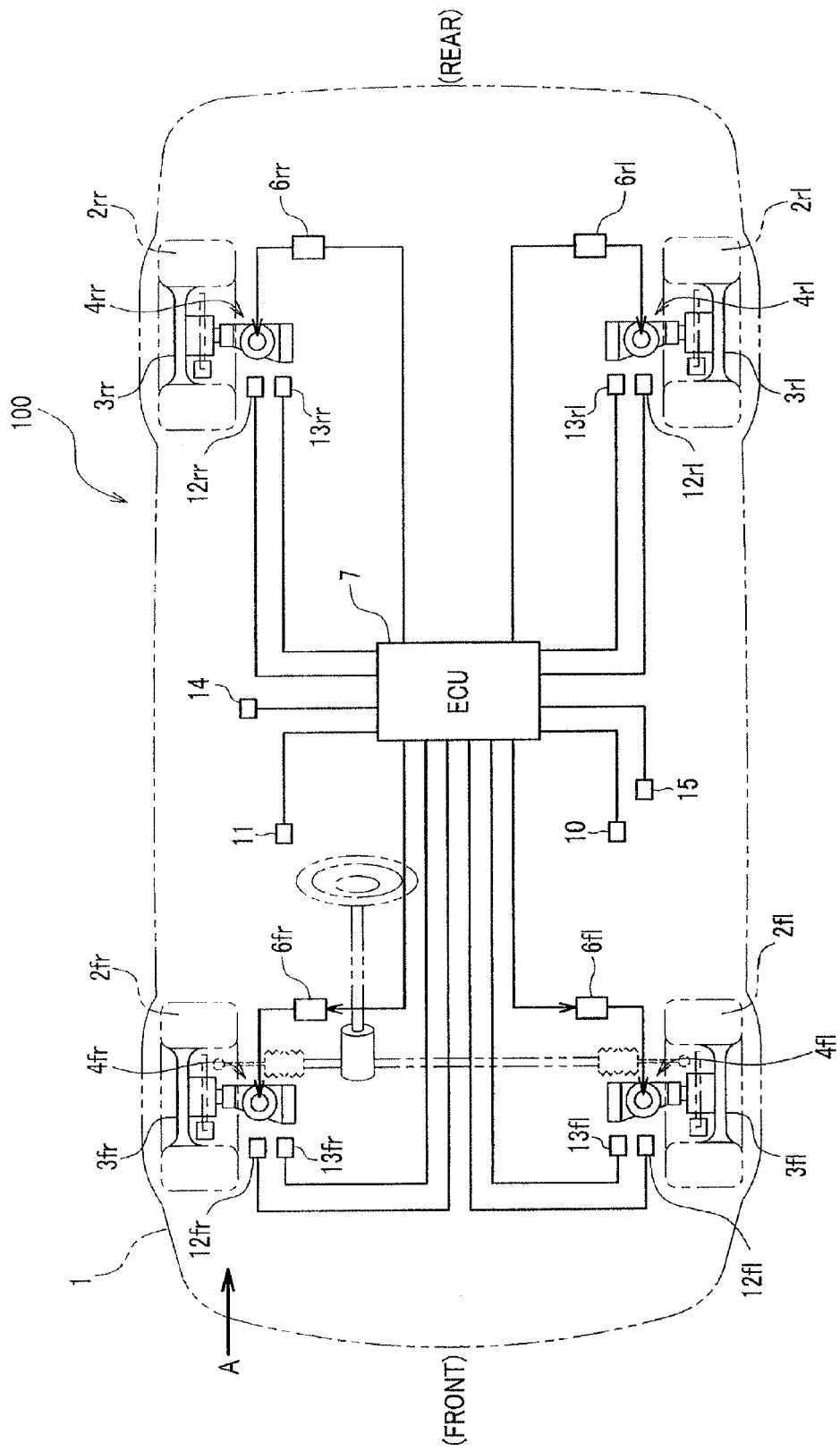
FIG. 1 is a plan view showing a general structure of a four-wheel vehicle equipped with a control device for a damping-force adjustable damper according to an embodiment of the present invention.

In addition, FIG. 1 is a plan view showing a general structure of a four-wheel vehicle 100 (hereinafter, referred to as a vehicle 100) equipped with the control device for the damping-force adjustable damper according to the embodiment of the present invention.

In the following explanation, a reference mark fl indicating front left or a reference mark fr indicating front right is added to a reference numeral given to each structural element if such structural element is located at front left or at front right. Also, a reference mark rl indicating rear left or a reference mark rr indicating rear right is added to a reference numeral given to each structural element if such structural element is located at rear left or at rear right. For example, regarding wheels 3, a front-left wheel will be mentioned as a wheel 3fl, a front-right wheel will be mentioned as a wheel 3fr, a rear-left wheel will be mentioned as a wheel 3rl, and a rear-right wheel will be mentioned as a wheel 3rr.

When each structural element will be collectively referred to regardless of the position in the vehicle 100, the added reference mark will be omitted and such structural element will be referred to as, for example, a wheel 3.

Figure 2:
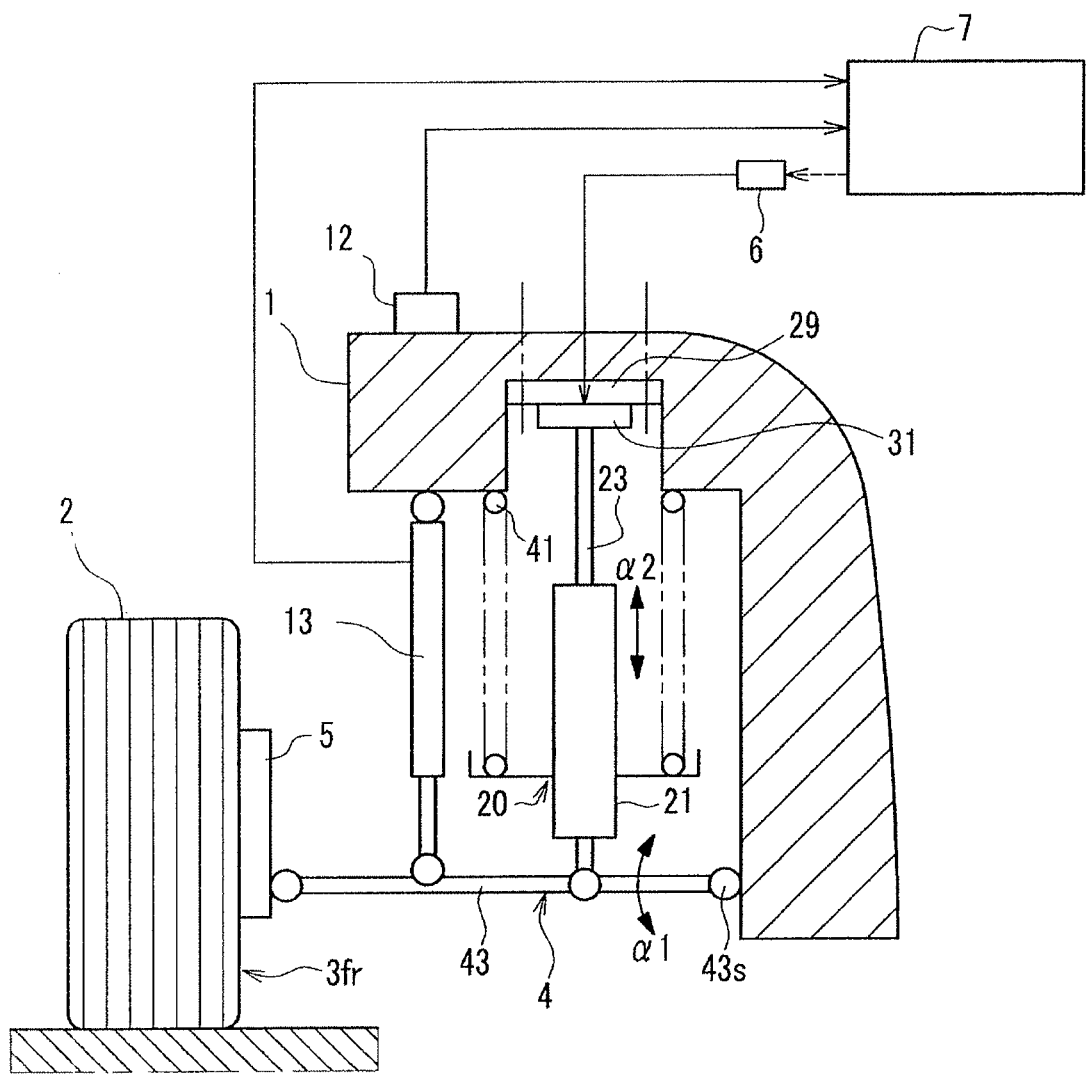
FIG. 2 is a cross-sectional view showing a major part of a suspension device for a front-right wheel of the four-wheel vehicle shown in FIG. 1 along a direction A.

FIG. 2 is a cross-sectional view showing a major part of the suspension device 4 for the front-right wheel 3fr of the vehicle 100 shown in FIG. 1 along a direction A.

As shown in FIG. 1, the vehicle 100 has four wheels 3 each provided with a tire 2. As shown in FIG. 2, each wheel 3 is suspended to a vehicle body 1 by the suspension device 4 which comprises a suspension arm 43, a coil spring 41 for providing elastic force, and a damping-force adjustable damper 20 (hereinafter, referred to as a damper 20) which adjustably controls damping force.

More specifically, each wheel 3 is so supported by the suspension arm 43 as to be rotatable (in a direction of an arrow α1 shown in FIG. 2) around a support shaft 43s of the vehicle body 1 via a knuckle 5 which supports the wheel 3 in a rotatable manner. The wheel 3 is also supported by the coil spring 41 and the damper 20 in a vertically (in a direction of an arrow α2 shown in FIG. 2) movable manner relative to the vehicle body 1.

Provided around the suspension device 4 of the vehicle 100 are a damper displacement sensor 13 which detects any displacement of the damper 20 (a damper-stroke position), and a vertical G sensor 12 which detects an acceleration of the vehicle body 1 over the coil spring 41 in the vertical direction (in the vertical direction in FIG. 2). A control device 7 (hereinafter, referred to as an ECU (Electronic Control Unit) 7) which comprehensively controls the damping force of each damper 20 is provided in the vehicle body 1.

Further, a drive circuit 6 which performs Pulse Width Modulation (PWM) control on a direct current supplied to each damper 20 from a battery (not shown) for damping-force control is provided for each wheel 3.

Furthermore, the vehicle body 1 shown in FIG. 1 is provided with various sensors, such as a horizontal G sensor 10 which detects a horizontal acceleration (in the vertical direction in FIG. 1) of the vehicle 100, a yaw rate sensor 11 which detects a yaw rate around a vertical axis passing through a center of gravity of the vehicle 100, a vehicle speed sensor 14 which detects a vehicle speed, and a front-rear G sensor 15 which detects an acceleration of the vehicle 100 in a front-rear direction (a right-left direction in FIG. 1).

Input into the ECU 7 which controls the damping force of the damper 20 are a signal from the damper displacement sensor 13 shown in FIG. 2, a signal from the vertical G sensor 12, a signal from the front-rear G sensor 15 shown in FIG. 1, a signal from the horizontal G sensor 10, and a signal from the vehicle speed sensor 14, etc.

<<Damper 20 for Suspension Device 4>>

Figure 3:
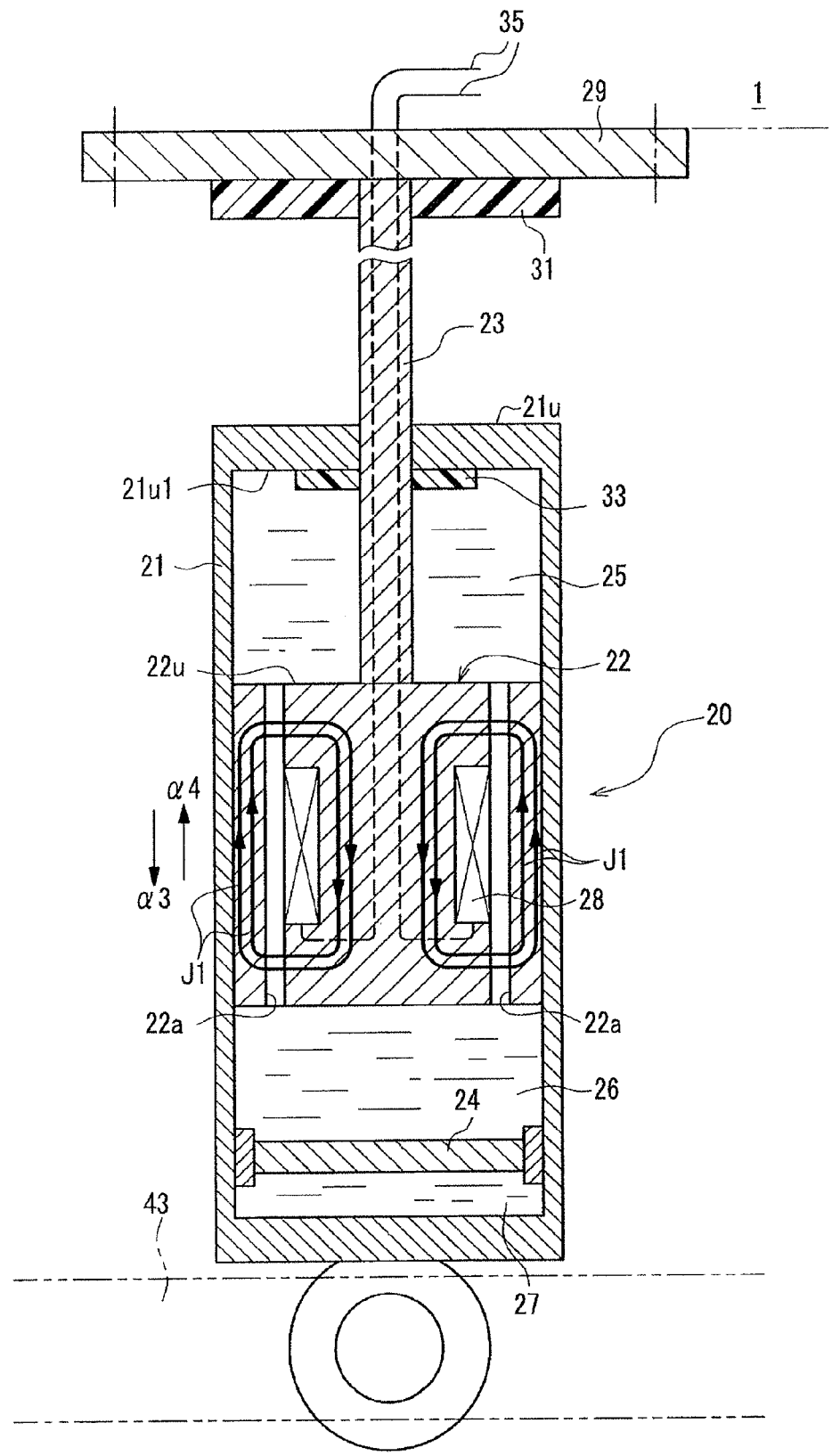
FIG. 3 is a vertical cross-sectional view showing an interior of a damping-force adjustable damper used for the suspension device shown in FIG. 2.

FIG. 3 is a vertical cross-sectional view showing the interior of the damper 20 used in the suspension device 4 shown in FIG. 2.

As shown in FIG. 3, the damper 20 comprises a cylindrical cylinder 21 which has a lower end connected to the suspension arm 43 (see FIG. 2) and which contains magneto-rheological fluid therein, a columnar piston 22 which is slidably fitted in the cylinder 21 and has fluid paths 22a through which the magneto-rheological fluid flows, a piston rod 23 which is integrally formed with the piston 22, extends upwardly therefrom, passes all the way through the upper wall of the cylinder 21 in a liquid-tight manner, and has an upper end connected to the vehicle body 1 via an upper mount 29, and a free piston 24 which is engaged with the internal wall at the lower part of the cylinder 21 in a slidable manner.

The interior of the cylinder 21 is divided into an upper first fluid chamber 25 and a lower second fluid chamber 26 by the piston 22, each filled with the magneto-rheological fluid. The magneto-rheological fluid in the cylinder 21 comes and goes between the first fluid chamber 25 and the second fluid chamber 26 via the fluid paths 22a of the piston 22 together with a vertical motion of the piston 22.

Also, a gas chamber 27 is formed at the lower internal part of the cylinder 21 by the free piston 24, and a compressed gas is air-tightly filled in the gas chamber 27.

A coil 28 which changes the damping force of the damper 20 by a magnetic field is wound inside the piston 22 along the circumferential direction thereof. A feeder 35 for the coil 28 is wired to the vehicle body 1 (see FIG. 2) by way of a hollow part (not shown) of the center of the piston rod 23, and is connected to the drive circuit 6.

The magneto-rheological fluid filled in the cylinder 21 is viscosity fluid like an oil containing ferromagnetic-substance particles like iron powders dispersed therein.

By supplying a current to the coil 28 in the piston 22 so as to apply a magnetic field to the magneto-rheological fluid, the ferromagnetic-substance particles are magnetized and lined up along the magnetic field lines, the flow of magneto-rheological fluid through the fluid paths 22a of the piston 22 is suppressed, thereby increasing the apparent viscosity.

When the damping force of the damper 20 is changed, as shown in FIG. 2, a PWM-control instruction value (an instruction signal for a target current It to be discussed later) output by the ECU 7 is input into the drive circuit 6, and the drive circuit 6 controls a current to the coil 28. In this fashion, a current is applied to the coil 28 by the drive circuit 6 through the feeder 35.

As a current is supplied to the coil 28 in the piston 22, as shown in FIG. 3, magnetic fluxes J1 indicated by arrows are generated, the ferromagnetic-substance particles in the magneto-rheological fluid passing through the fluid paths 22a are magnetized by the fluxes passing through the fluid paths 22a, and are lined up along the magnetic field lines, so that the flowability of the magneto-rheological fluid through the fluid paths 22a changes, thereby changing the apparent viscosity of the magneto-rheological fluid. Accordingly, the vertical motion of the piston 22 is controlled, and the damping force of the damper 20 is controlled in accordance with the magnitude of a current flowing through the coil 28.

<Operation of Damper 20>

The damper 20 operates as follow.

As the damper 20 contracts and the piston 22 moves downwardly (the direction of an arrow $\alpha 3$ in FIG. 3) relative to the cylinder 21, the magneto-rheological fluid in the second fluid chamber 26 flows through the fluid paths 22a of the piston 22, and flows in the first fluid chamber 25, so that the volume of the first fluid chamber 25 increases and the volume of the second fluid chamber 26 decreases. Conversely, as the damper 20 extends and the piston 22 moves upwardly (the direction of an arrow $\alpha 4$ in FIG. 3) relative to the cylinder 21, the magneto-rheological fluid in the first fluid chamber 25 flows through the fluid paths 22a of the piston 22, and flows in the second fluid chamber 26, so that the volume of the second fluid chamber 26 increases and the volume of the first fluid chamber 25 decreases. At this time, the damping force of the damper 20 is generated by the viscosity resistance of the magneto-rheological fluid flowing through the fluid paths 22a.

At this time, as a current is supplied to the coil 28 in the piston 22 to generate a magnetic field, the apparent viscosity of the magneto-rheological fluid in the fluid paths 22a of the piston 22 increases so that it becomes difficult for the magneto-rheological fluid to flow through the fluid paths 22a, thereby increasing the damping force of the damper 20. The increment of the damping force can be controlled arbitrary by changing the magnitude of a current supplied from the drive circuit 6 to the coil 28.

In addition, as compression load (load to the piston 22 in the direction of the arrow $\alpha 3$ in FIG. 3) as a shock is applied to the damper 20 and the volume of the second fluid chamber 26 decreases, because of rapidly-increasing pressure of the magneto-rheological fluid in the second fluid chamber 26, the free piston 24 is descended, so that the gas chamber 27 becomes small, and the compressed gas in the gas chamber 27 is compressed, thereby absorbing shock energy.

On the other hand, as tensile load (load to the piston 22 in the direction of the arrow $\alpha 4$ in FIG. 3) as a shock is applied to the damper 20 and the volume of the second fluid chamber 26 increases, because of rapidly-decreasing pressure of the magneto-rheological fluid in the second fluid chamber 26, the free piston 24 is ascended, so that the gas chamber 27 becomes expanded, and the compressed gas in the gas chamber 27 is expanded, thereby absorbing shock energy.

Further, as the piston 22 is descended (in the direction of the arrow $\alpha 3$ in FIG. 3) and the volume of the piston rod 23 contained in the cylinder 21 increases, because of increasing pressure of the magneto-rheological fluid in the cylinder 21, the free piston 24 is descended, and the compressed gas in the gas chamber 27 is compressed, thereby absorbing the increment of the volume of such gas.

Also, as shown in FIG. 3, a bound stopper 31 made of an elastic material is fixed at an upper end part of the piston rod 23, and is supported at the vehicle body 1 side (see FIG. 2). The hound stopper 31 made of an elastic material relieves a shock due to a collision between an upper end face 21u of the cylinder 21 of the damper 20 and the vehicle body 1 through an internal friction generated by deformation of the bound stopper 31 when the suspension device 4 is fully bumped (maximum compressed condition).

Likewise, a rebound stopper 33 made of an elastic material is provided on an upper-end bottom face 21u1 of the cylinder 21. The rebound stopper 33 relieves a shock due to a collision between the upper-end bottom face 21u1 of the cylinder 21 of the damper 20 and an upper face 22u of the piston 22 through an internal friction generated by deformation of the rebound stopper 33 when the suspension device 4 is fully rebounded (maximum extended condition).

<<Control Device for Damper 20>>

Next, an explanation will be given of the ECU 7 which is the control device for the damper 20 with reference to FIG. 4.

Figure 4:
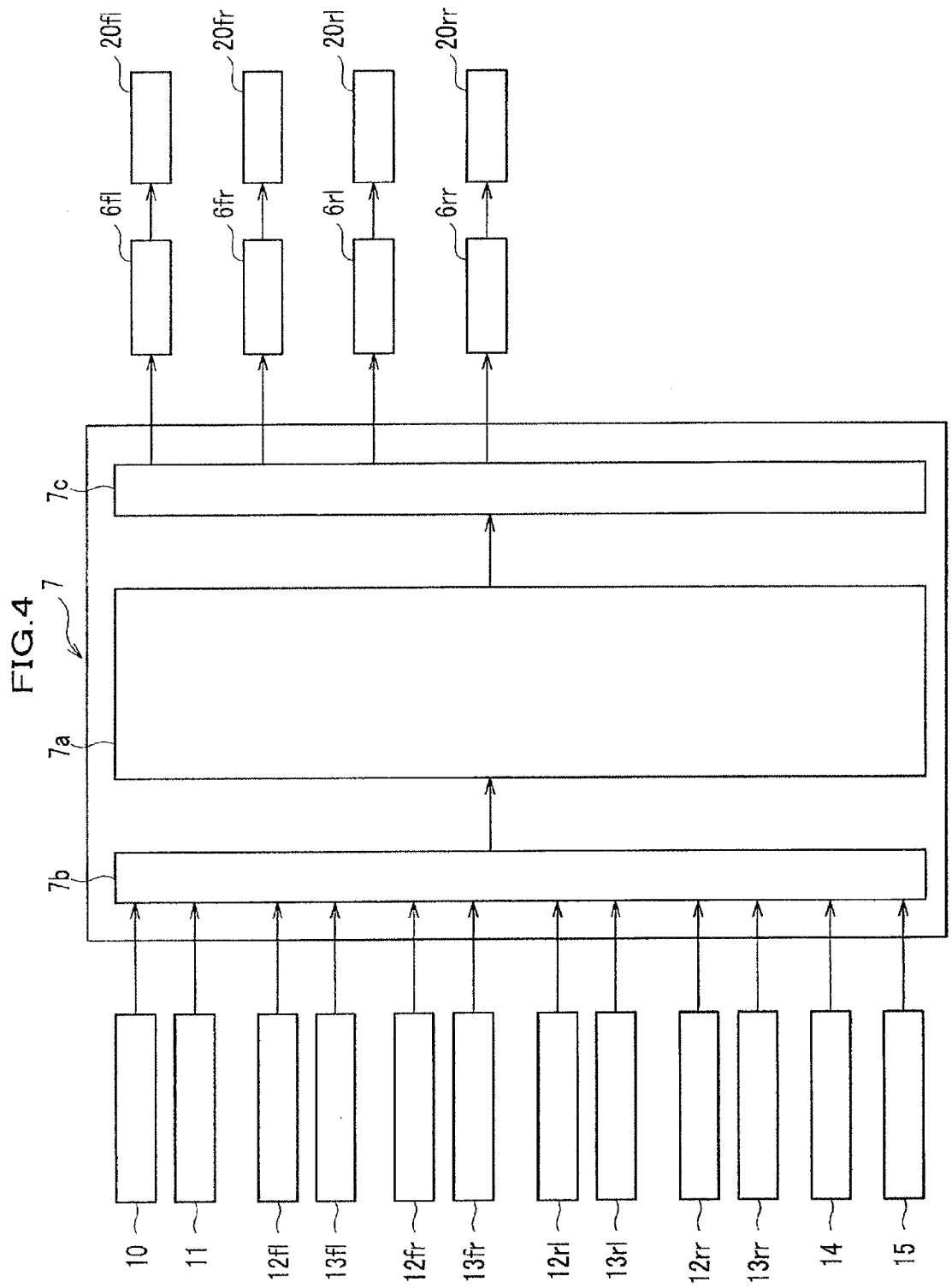
FIG. 4 is a block diagram showing a general hardware structure of a control device for the damping-force adjustable damper.

FIG. 4 is a block diagram showing a general hardware structure of the control device (ECU 7) for the damping-force adjustable damper 20.

As shown in FIG. 4, the ECU 7 comprises a microcomputer 7a including a CPU, a ROM (Read Only Memory), a RAM (Random Access Memory), a non-volatile memory, and an I/O port (all not shown), an input interface circuit 7b connected to the I/O port of the microcomputer 7a, and an output interface circuit 7c. The input interface circuit 7b includes a filtering process circuit using an operational amplifier and an A/D converter.

The ROM of the ECU 7 stores a control program for adjustably controlling the damping force of the damper 20 and the control program is written in C language or the like. As the CPU of the ECU 7 expands the control program in the RAM and runs such program, the damping force of the damper 20 is adjustably controlled to a desired level as will be discussed later.

The ECU 7 sets individual target current values subjected to PWM control for controlling the damping forces of individual dampers 20fl, 20fr, 20rl, and 20rr of the wheels 3fl, 3fr, 3rl, and 3rr based on stroke displacements of the dampers 20 detected by the damper displacement sensors 13fl, 13fr, 13rl, 13rr shown in FIG. 2, vertical accelerations of the sprung masses in the vertical direction detected by the vertical G sensors 12fl, 12fr, 12rl, 12rr, an acceleration of sprung mass in the front-rear direction detected by the front-rear G sensor 15 shown in FIG. 1, a horizontal acceleration in the horizontal direction detected by the horizontal G sensor 10, and a vehicle speed V of the vehicle 100 detected by the vehicle speed sensor 14. The ECU 7 outputs each of set target current-values to the drive circuit 6fl, 6fr, 6rl, 6rr.

Note that a target current-value corresponds to a target output value in claims.

Figure 5:
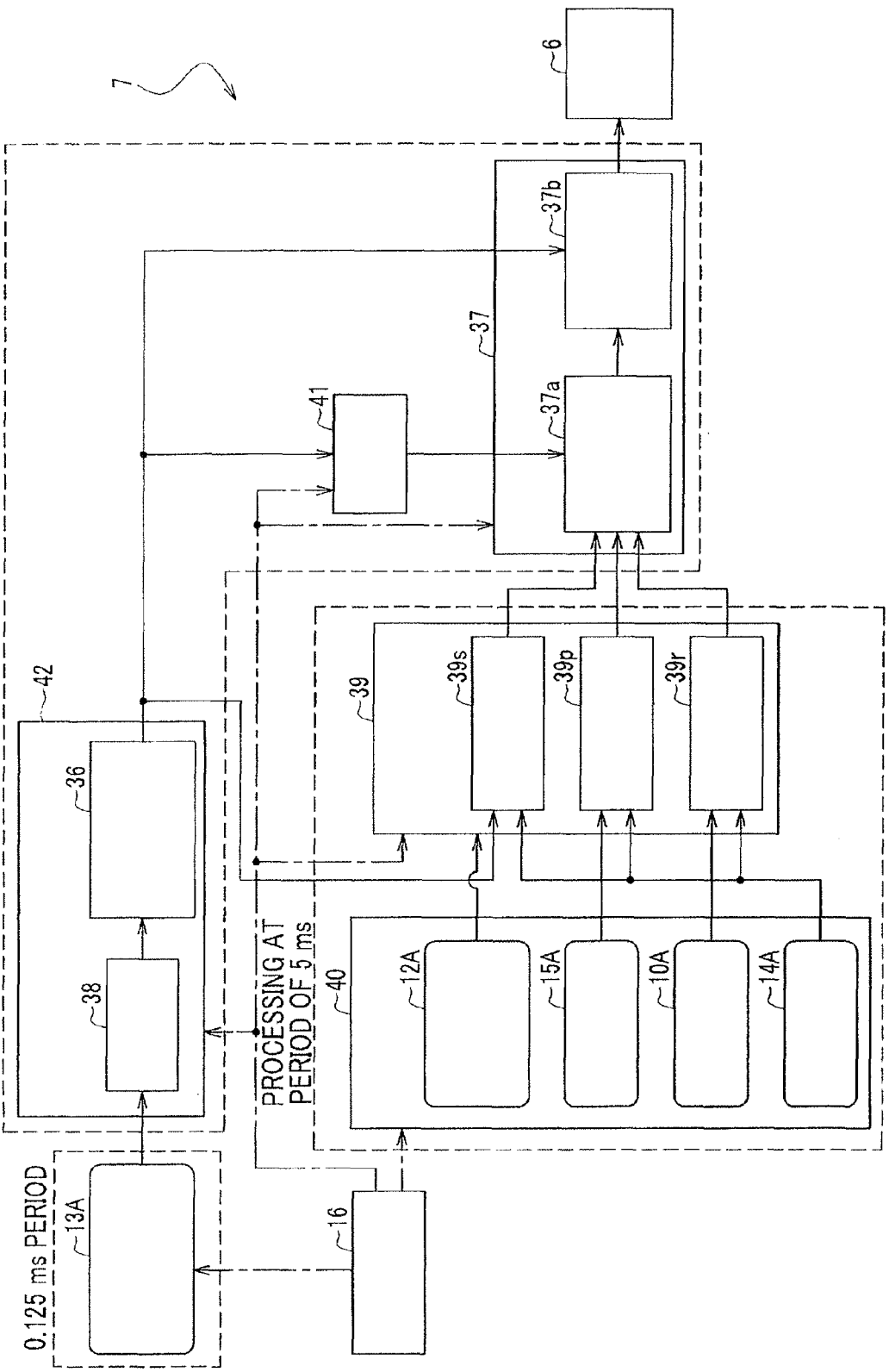
FIG. 5 is a functional block diagram of the control device (ECU) for the damping-force adjustable damper.

FIG. 5 is a functional block diagram of the ECU 7.

As shown in FIG. 5, the ECU 7 has a damper-stroke speed calculating unit 36 which calculates a stroke speed Vs obtained by averaging information on a damper-stroke position, output by a damper-stroke position detection unit 13A in a signal reading unit of the damper displacement sensor 13, through an averaging process 38, and by performing time-differentiation on the averaged information. Note that the averaging process 38 and the damper-stroke speed calculating unit 36 are collectively called a damper motion detecting unit 42.

Further, the ECU 7 has an unsprung control unit 41 which obtains an unsprung target damping force Db that is a target damping force for suppressing any motion of unsprung mass from the stroke speed Vs, and a target damping force calculating unit 39 which obtains respective target damping forces from sky-hook control 39s, pitch control 39p, and roll control 39r based on vehicle motion information output by a vehicle motion detecting unit 40.

That is, the target damping force calculating unit 39 calculates the target damping force of the damper 20 which makes a ride quality comfortable from the motional condition of the vehicle body 1, and road condition, etc.

In addition, the vehicle motion detecting unit 40 which outputs the vehicle motion information to the target damping force calculating unit 39 includes a vehicle vertical-motion detecting unit 12A in the signal reading unit of the vertical G sensor 12, a vehicle front-rear-motion detecting unit 15A in the signal reading unit of the front-rear G sensor 15, a vehicle horizontal-motion detecting unit 10A in the signal reading unit of the horizontal G sensor 10. and a vehicle speed detecting unit 14A in the signal reading unit of the vehicle speed sensor 14.

Also, the ECU 7 has a target current calculating unit 37 which selects the largest damping force among the unsprung target damping force Db obtained by the unsprung control unit 41 and the target damping forces obtained by the target damping force calculating unit 39 through a damping-force high-select unit 37a, and converts, through a damping-force/current converter 37b, the selected target damping force into a target current-value to be allowed to flow through the coil 28 of the damper 20.

Also, the ECU 7 has a processing-period setting unit 16 which sets respective processing periods or detection periods of the damper-stroke position detecting unit 13A, the damper motion detecting unit 42 including the damper-stroke speed calculating unit 36, the unsprung control unit 41, the vehicle motion detecting unit 40, the target damping force calculating unit 39, and the target current calculating unit 37 using a CTC (Counter/Timer Circuit) or the like.

Here, the vehicle 100 has the damper-stroke position detecting unit 13A and the vehicle vertical-motion detecting unit 12A correspondingly provided for each of the four wheels 3, and the damper motion detecting unit 42, the unsprung control unit 41, the target damping force calculating unit 39, and the target current calculating unit 37, etc, execute respective processes corresponding to each of the four wheels 3.

The target damping force calculating unit 39 calculates a sky-hook-control target damping force Ds, a pitch-control target damping force Dp, and a roll-control target damping force Dr which are respective target damping forces from the sky-hook control 39s that suppresses any shaking of the vehicle 100 when the vehicle 100 runs over bumps of a road so as to improve a ride quality, the pitch control 39p that suppresses any pitching of the front and the rear of the vehicle 100 moving up and down (in the direction perpendicular to the paper of FIG. 1) when the vehicle 100 suddenly accelerates or suddenly decelerates, and the roll control 39r that suppresses any rolling (a rotational motion of the vehicle 1 around an axis in the front-rear direction thereof) when the vehicle 100 turns.

On the other hand, the unsprung control unit 41 grasps a motion of unsprung mass from the stroke speed Vs of each damper 20 obtained by the damper-stroke speed calculating unit 36, and obtains the unsprung target damping force Db which is the target damping force for suppressing any motion of unsprung mass.

<<Process for Obtaining Current Allowed to Flow Through Coil 28 of Damper 20>>

Figure 6:
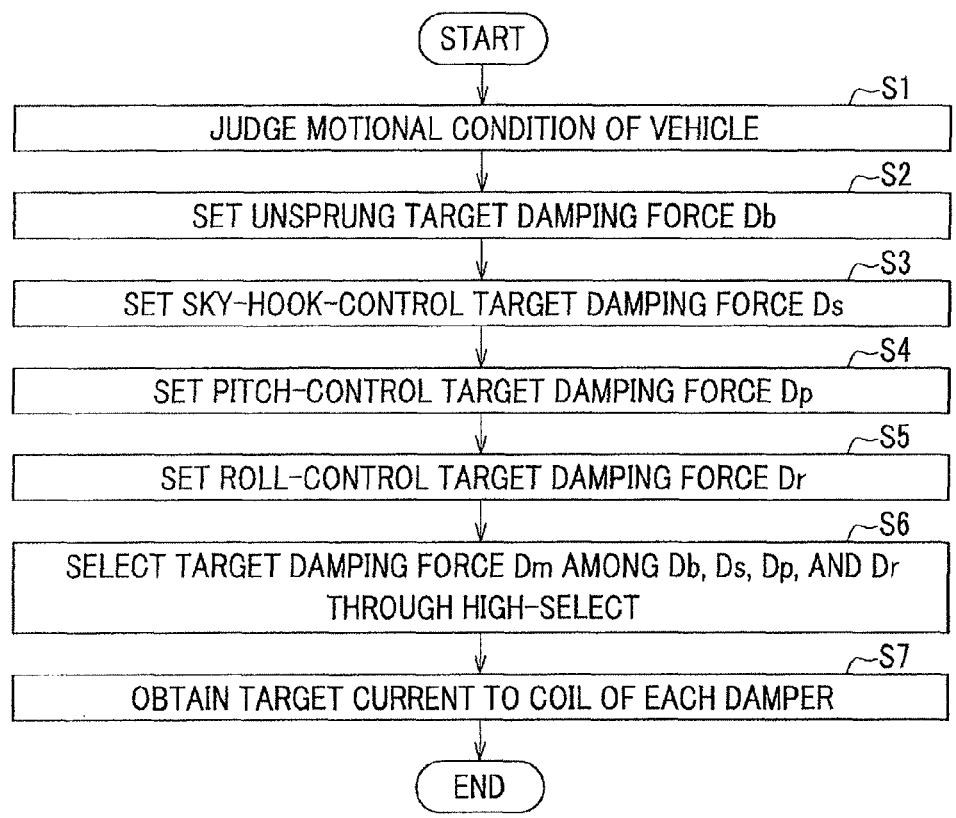
FIG. 6 is a flowchart for a process of obtaining a current (target current) to be allowed to flow through each damper.

Next, an explanation will be given of a process of obtaining a target current It which is a current allowed to flow through the coil 28 of each damper 20 in order to control the damping force of each damper 20 with reference to FIG. 6. FIG. 6 is a flowchart for the process of obtaining the target current It allowed to flow through each damper 20.

As the vehicle 100 starts travelling, the ECU 7 executes, at a predetermined period set by the processing-period setting unit 16, the process of obtaining a current (the target current It) to be allowed to flow through the coil 28 of each damper 20 through steps shown in FIG. 6. In the flowchart of FIG. 6, a process to be explained in this process will be denoted by a symbol S.

In a step S1 in FIG. 6, a motional condition of the vehicle 100 is judged based on respective accelerations and rotational angular speeds obtained from the horizontal G sensor 10, the yaw rate sensor 11, the vertical G sensor 12, the front-rear G sensor 15, and the like, a displacement of the damper 20 obtained by the damper displacement sensor 13, a vehicle speed input from the vehicle speed sensor 14, and a steering speed input from a steering angle sensor (not shown).

Next, in a step S2 in FIG. 6, the unsprung control unit 41 sets the unsprung target damping force Db as follow.

The stroke speed Vs of the damper 20 is obtained by averaging plural damper-stroke positions detected by the damper displacement sensor 13 and the damper-stroke position detecting unit 13A, respectively, through the averaging process 38, and by performing time-differentiation on the averaged damper-stroke position through the damper-stroke speed calculating unit 36.

The stroke speed Vs which is output by the damper-stroke speed calculating unit 36 is updated at the same period as that of the target current calculating unit 37 or at a shorter period than that of the target current calculating unit 37.

Detection of a damper-stroke position by the damper-stroke position detecting unit 13A is carried out at a shorter period (e.g., detection of a damper-stroke position is carried out at 0.125 ms period relative to 0.5 ms period of the target current calculating unit 37), plural damper-stroke positions obtained by the damper-stroke speed calculating unit 36 at the period of 0.125 ms are averaged, and the averaged damper-stroke position is subjected to time-differentiation so as to obtain a stroke speed Vs. Alternatively, damper-stroke positions are obtained by the damper-stroke position detecting unit 13A at a shorter period (e.g., 0.125 ms period), the damper-stroke positions obtained at the period of 0.125 ms are subjected to time-differentiation by the damper-stroke speed calculating unit 36, plural stroke speeds at the period of 0.125 ms are obtained and averaged so as to obtain a stroke speed Vs.

As shown in FIG. 5, each stroke speed Vs of each damper 20fl, 20fr, 20rl, and 20rr obtained by each damper-stroke speed calculating unit 36 is input into the unsprung control unit 41, and the unsprung control unit 41 sets, using a map preset beforehand or in a theoretical manner without using such a map, each unsprung target damping force Db for suppressing any motion of current unsprung mass from the stroke speed Vs of each damper 20.

Next, in a step S3 in FIG. 6, pieces of data, such as each stroke speed Vs which is an output by the damper-stroke speed calculating unit 36, accelerations of vertical motions of the front and the rear of the vehicle body 1 measured by the vertical G sensors 12fl, 12fr, 12rl, and 12rr, and respective vehicle vertical-motion detecting units 12A, and a vehicle speed of the vehicle 100 detected by the vehicle speed sensor 14 and the vehicle speed detecting unit 14A, are input into the sky-hook control 39s shown in FIG. 5, and based on such input data, the target damping force calculating unit 39 sets the sky-hook-control target damping forces Ds for respective dampers 20fl, 20fr, 20rl, and 20rr through the sky-hook control 39s.

The sky-hook-control target damping force Ds is set by multiplying a vertical speed of the vehicle body 1 calculated from a detection result of each vertical G sensor 12, and, each stroke speed Vs which is an output by the damper-stroke speed calculating unit 36 by a predetermined gain in accordance with the vehicle speed of the vehicle 100, respectively.

The sky-hook-control target damping force Ds becomes low damping force when the speed of the vehicle body 1 in the vertical direction is equal to the speed of the wheel 3 relative to the vehicle body 1 in the vertical direction, and becomes high damping force when both speeds in the vertical direction are not equal. When such target damping force is high, as the damping force is set to be proportional to the vertical speed of the vehicle body 1, any changeover sound and any uncomfortable feeling are reduced.

Next, in a step S4 in FIG. 6, pieces of data, such as accelerations of vertical motions of the front and the rear of the vehicle body 1 measured by respective vertical G sensors 12 and respective vehicle vertical-motion detecting units 12A, an acceleration of sprung mass in the front-rear direction detected by the front-rear G sensor 15 and the vehicle front-rear-motion detecting unit 15A, and a vehicle speed V of the vehicle 100 detected by the vehicle speed sensor 14 and the vehicle speed detecting unit 14A, are input into the pitch control 39p shown in FIG. 5, and based on such input data, the target damping force calculating unit 39 sets the pitch-control target damping forces Dp for respective dampers 20fl, 20fr, 20rl, and 20rr through the pitch control 39p.

Next, in a step S5 in FIG. 6, pieces of data, such as accelerations of vertical motions of the front and the rear of the vehicle body 1 measured by respective vertical G sensors 12 and respective vehicle vertical-motion detecting units 12A, a horizontal acceleration of the vehicle body 1 in the horizontal direction measured by the horizontal G sensor 10 and the vehicle horizontal-motion detecting unit 10A, and a vehicle speed of the vehicle 100 detected by the vehicle speed sensor 14 and the vehicle speed detecting unit 14A, are input into the roll control 39r shown in FIG. 5, and based on such input data, the target damping force calculating unit 39 sets the roll-control target damping forces Dr for respective dampers 20fl, 20fr, 20rl, and 20rr through the roll control 39r.

Next, in a step S6 in FIG. 6, the high-select unit 37a of the target current calculating unit 37 shown in FIG. 5 selects, as target damping forces Dm for each damper 20fl, 20fr, 20rl, 20rr, the maximum damping force among the unsprung target damping force Db set by the unsprung control unit 41, the sky-hook-control target damping force Ds set by the sky-hook control 39s, the pitch-control target damping force Dp set by the pitch control 39p, and the roll-control target damping force Dr set by the roll control 39r.

Next, in a step S7 in FIG. 6, the damping-force/current converter 37b of the target current calculating unit 37 obtains a target current It to be allowed to flow through the coil 28 of each damper 20 from each target damping force Dm.

Figure 7:
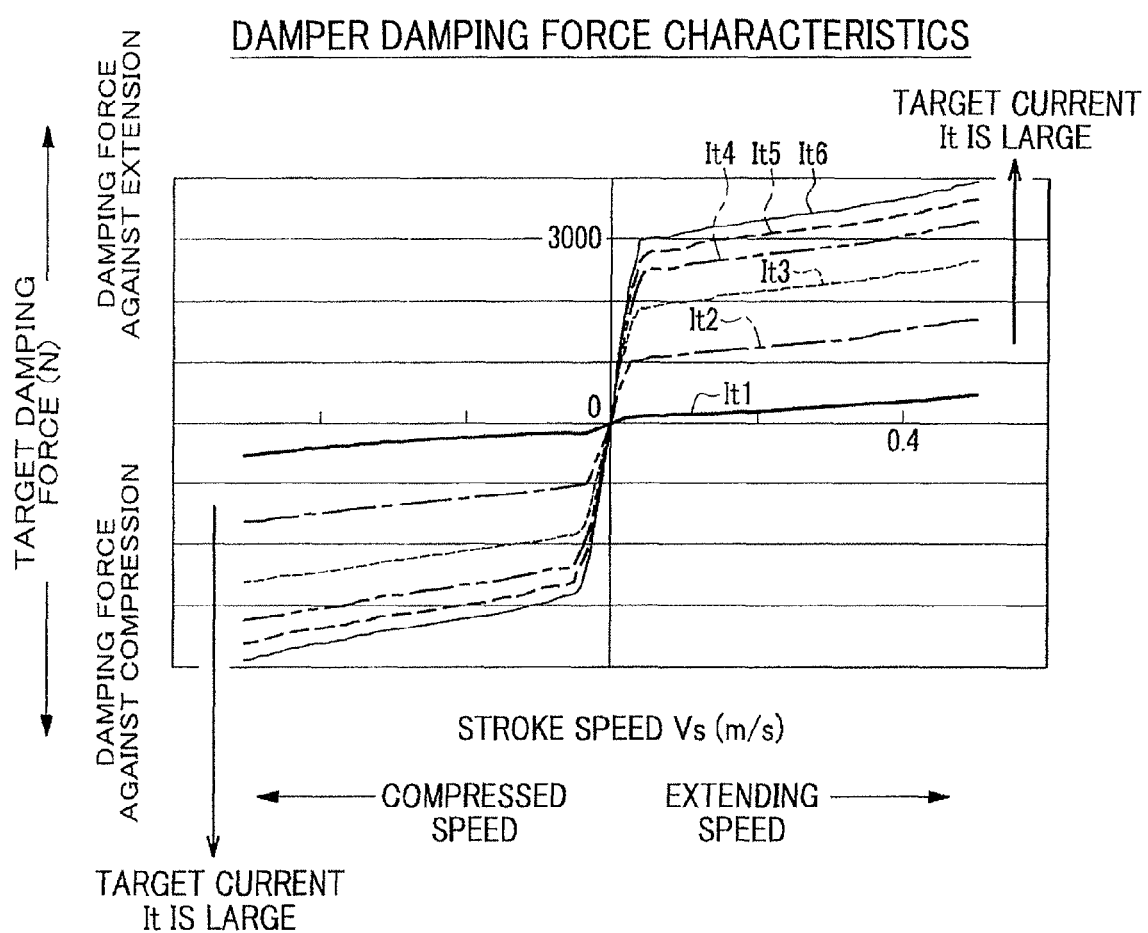
FIG. 7 is a map for searching a target current from a target damping force and a stroke speed.

More specifically, the damping-force/current converter 37b obtains each target current to be allowed to flow through the coil 28 of each damper 20fl, 20fr, 20rl, 20rr based on a damper damping-force characteristic shown in FIG. 7 from the target damping force Dm set by the high-select unit 37a, and from the stroke speed Vs obtained by the damper-stroke speed calculating unit 36.

In addition, FIG. 7 is a map for searching a target current It from target damping force Ft and a stroke speed Vs. In FIG. 7, the vertical axis represents a target damping force Ft (N), the damping force against extension of the damper 20 takes a positive (+) value, and the damping force against compression of the damper 20 takes a negative (−) value, and, the horizontal axis represents a stroke speed Vs (m/s), a speed when the damper 20 extends takes a positive (+) value and a speed when the damper 20 compresses takes a negative (−) value.

In FIG. 7, as the damping force against extension of the damper 20 (target damping force Ft in the vertical axis is (+)) when the damper 20 is compressed (a stroke speed Vs in the horizontal axis is (−)) is shown in the second quadrant, a target current It becomes zero. Likewise, as the damping force against compression of the damper 20 (target damping force in the vertical axis is (−)) when the damper 20 extends (a stroke speed Vs in the horizontal direction is (+)) is shown in the fourth quadrant, a target current It also becomes zero.

According to FIG. 7, when the stroke speed Vs (horizontal axis) is constant, as the target damping force Ft (vertical axis)

increases, the target current It changes from It1 side to It6 side and increases. Conversely, as the target damping force Ft (vertical axis) decreases, the target current It changes from It6 side to It1 side and decreases. For example, when the stroke speed Vs (horizontal axis) is 0.4 m/s, as the target damping fore Ft (vertical axis) increases, the target current It changes from It1 side to It6 side, and increases.

Also, when the target damping force Ft (vertical axis) is constant, as the stroke speed Vs (horizontal axis) increases, the target current It changes from It6 side to It1 side and decreases. Conversely, as the stroke speed Vs (horizontal axis) decreases, the target current It changes from It1 side to It6 side and increases. For example, when the target damping force Ft (vertical axis) is 3000 N, as the stroke speed Vs increases, the target current It changes from It6 side to It4 side, and decreases.

The above-explained steps shown in FIG. 6 are the process of obtaining the target current It which is allowed to flow through the coil 28 of each damper 20.

<<Processing Period of ECU 7>>

Next, an explanation will be given of a processing period of the ECU 7 which is the control device for the damping force of the damper 20.

Figures 8, 9:
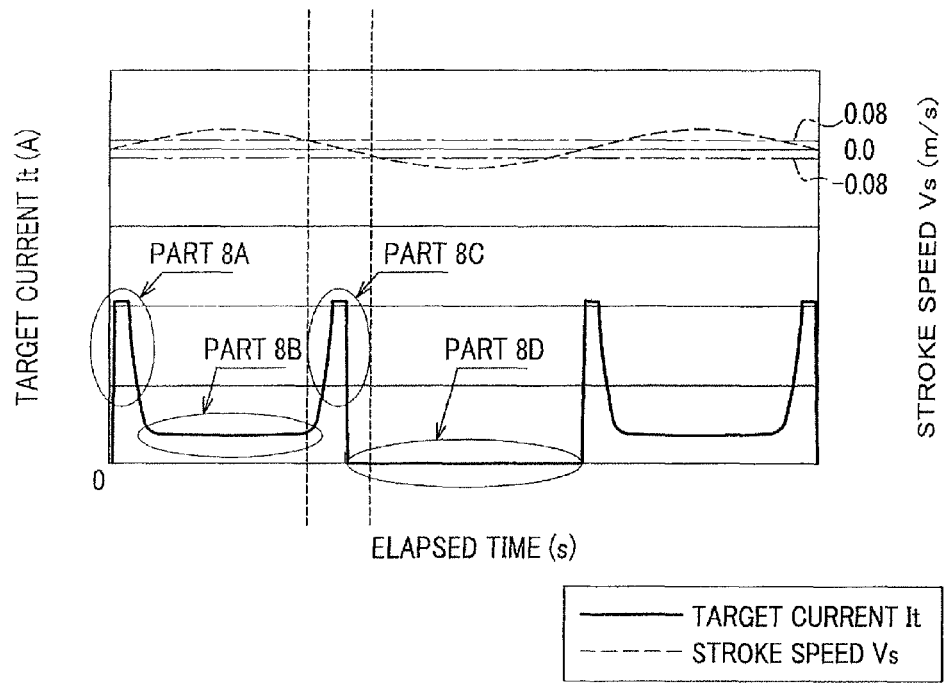
FIG. 8 is a diagram showing a relationship between a target current allowed to flow through a coil of the damper and a stroke speed with respect to an elapsed time in a case in which the target damping force is fixed to 1000 N that counteracts when the damper extends.
FIG. 9 is a diagram showing a comparison result between an conventional example and this embodiment for a processing period and for a processing time with respect to vehicle motion detection, target damping force calculation, target current calculation, stroke speed calculation, and damper-stroke-position detection.

When the target damping force Ft is fixed to, for example, 1000 N that counteracts when the damper 20 extends, as shown in FIG. 8, the target current It changes in accordance with a change in the stroke speed Vs.

Note that FIG. 8 is a diagram showing a relationship between the target current It (indicated by a continuous line) allowed to flow through the coil 28 of the damper 20 and the stroke speed Vs (m/s) (indicated by a dashed line) with respect to an elapsed time (s) in a case in which the target damping force Ft is fixed to 1000 N that counteracts when the damper 20 extends.

When the sign of the stroke speed Vs and that of the target damping force Ft (in this case, +1000 N) are consistent with each other, the target current It is shown in the first quadrant (the target damping force Ft and the stroke speed Vs are both positive (+)) in FIG. 7, and becomes equal to or greater than zero.

When the stroke of the damper 20 extends at a part 8A in FIG. 8, the target current It becomes large if the stroke speed Vs is between 0 and 0.08 m/s.

When the stroke of the damper 20 extends at a part 8B, the target current It becomes small if the stroke speed Vs is equal to or larger than 0.08 m/s.

At a part 8C, the target current It rapidly changes if the stroke speed Vs is around zero.

At a part 8D, when the stroke of the damper 20 reduces in length, as the sign of the stroke speed Vs becomes negative, when it is presumed that the target damping force Ft is 1000 N, the sign of the target damping force Ft is positive (+) and the sign of the stroke speed Vs is negative (−), so that both signs are not consistent with each other, and thus the target current It becomes zero.

As is clear from the above-explained fact, the target current It is large at a region where the stroke speed Vs is equal to or less than a certain value (in this case, 0.08 m/s), and the target current It becomes small when the stroke speed Vs becomes equal to or larger than the certain value (in this case, 0.08 m/s). Also, the target current It becomes zero when the sign of the stroke speed Vs is not consistent with the sign of the target damping force Ft. For example, in the second quadrant in FIG. 7, when the target damping force Ft (vertical axis) is positive (+) and the stroke speed Vs (horizontal axis) is negative (−), the sign of the stroke speed Vs and the sign of the target clamping force Ft are not consistent with each other, so that the target current It becomes zero. Likewise, in the fourth quadrant, when the target damping force Ft (vertical axis) is negative (−) and the stroke speed Vs (horizontal axis) is positive (+), the sign of the stroke speed Vs and the sign of the target damping force Ft are not consistent with each other, so that the target current It becomes zero.

As is clear from the above-explained result, the target current It has a characteristic that the target current It rapidly changes when the stroke speed Vs of the damper 20 is around zero (e.g., when the stroke speed Vs shown in FIG. 8 is equal to or less than about 0.08 m/s).

Meanwhile, it is known that a motion of sprung mass of the vehicle 100 has a resonant frequency in a range of 1 to 2 Hz in the case of a vertical motion, and frequencies equal to or higher than 1 Hz are dominant. In contrast, it is known that the stroke speed Vs of the damper 20 of unsprung mass has a resonant frequency in a range of 10 to 20 Hz, and as the frequency is ten times higher than that of the motion of the vehicle 100, it is desirable to set the processing period for a stroke motion of the damper 20 to be shorter than the processing period for a motion of the vehicle 100.

Also, as explained above, in a period of a stroke motion of the damper 20 shown in FIG. 8, as the target current for the damper 20 rapidly changes when the stroke speed Vs is around zero, it is desirable to set the processing period for a stroke motion of the damper to be shorter in order to enable calculation of the rapid change with a fine time resolution (processing period).

Also, the target current It to be allowed to flow through the damper 20 rapidly changes at a region where the sign of the stroke speed Vs of the damper 20 changes, i.e., a region where the stroke speed Vs changes between an extending speed and a compressed speed, so that it is desirable to suppress any effect of quantized noises of the stroke speed Vs at a region where the sign of the stroke speed Vs changes in order to obtain the target current It precisely.

As explained above, it is known that the stroke speed Vs of the damper 20 of unsprung mass has a resonant frequency in a range from 10 to 20 Hz which is 10 times as high as the resonant frequency of a motion of sprung mass of the vehicle 100. Accordingly, it is desirable that the target current calculating unit 37 (see FIG. 5) using the stroke speed Vs should execute a process at a period as much as one-tenth of the processing period of the target damping force calculating unit 39 using a motion of the vehicle 100.

Accordingly, in this embodiment, the processing-period setting unit 16 shown in FIG. 5 sets respective processing periods of the target current calculating unit 37, the damper-stroke speed detecting unit 36, and the unsprung control unit 41 which need to cope with the frequency components included in the stroke speed Vs to be different from respective processing periods of the vehicle motion detecting unit 40 and the target damping force calculating unit 39 which need to cope with the frequency components included in a motion of the vehicle 100.

Accordingly, a difference between the processing periods is set to be between five times and twenty times because the resonant frequency of the stroke speed Vs is ten times higher than that of the vehicle 100.

For example, when the resonant frequency of the stroke speed Vs is 20 Hz, the period thereof is 50 ms (=1 s/20 Hz). It is presumed that a range where the target current It rapidly changes is 10% relative to one period of the stroke speed Vs, so that the target current rapidly changes within 5 ms. Accordingly, the target current calculating unit 37 is set to execute a process within a sufficiently fine period relative to such rapid change, e.g., equal to or less than 0.5 ms.

The stroke speed Vs which is an output by the damper-stroke speed calculating unit 36 is updated at the same period as or at a shorter period than that of the target current calculating unit 37.

The stroke speed Vs is obtained by performing time-differentiation on a damper-stroke position, the damper-stroke position is detected at a further shorter period (e.g., 0.125 ms), plural detected values are averaged, and the averaged value is subjected to time-differentiation to obtain the stroke speed Vs. Alternatively, damper-stroke positions may be detected at a further shorter period, and subjected to time-differentiation to obtain individual stroke speeds, and such stroke speeds may be averaged to obtain the stroke speed Vs eventually.

FIG. 9 is a diagram for comparing a conventional example with this embodiment for a total process time when respective processing periods and respective process time at each processing period are the same for detection of a vehicle motion, calculation of the target damping force Ft, calculation of the target current It, calculation of the stroke speed Vs, and detection of the damper-stroke position.

According to FIG. 9, a process time for detection of the damper-stroke position in this embodiment increases up to 16 times from 2 ms period for the conventional example to 0.125 ms period for this embodiment, but as the other process times for detection of a vehicle motion, calculation of the target damping force Ft, etc., decreases from 2 ms period for the conventional example to 5 ms period for this embodiment, so that the process time as a total does not increase, and it becomes possible to cope with high frequency components of 10 to 20 Hz included in the stroke speed Vs without increasing the cost of CPU.

Figure 10A:
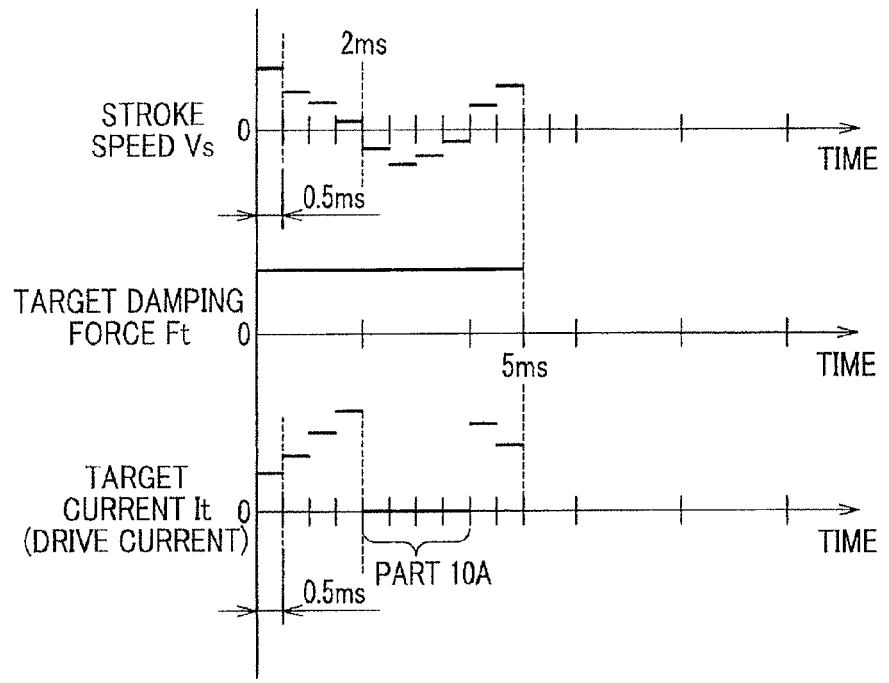
FIG. 10A is a diagram showing changes with time in the stroke speed, the target damping force, and the target current all shown in FIG. 9.
Figure 10B:
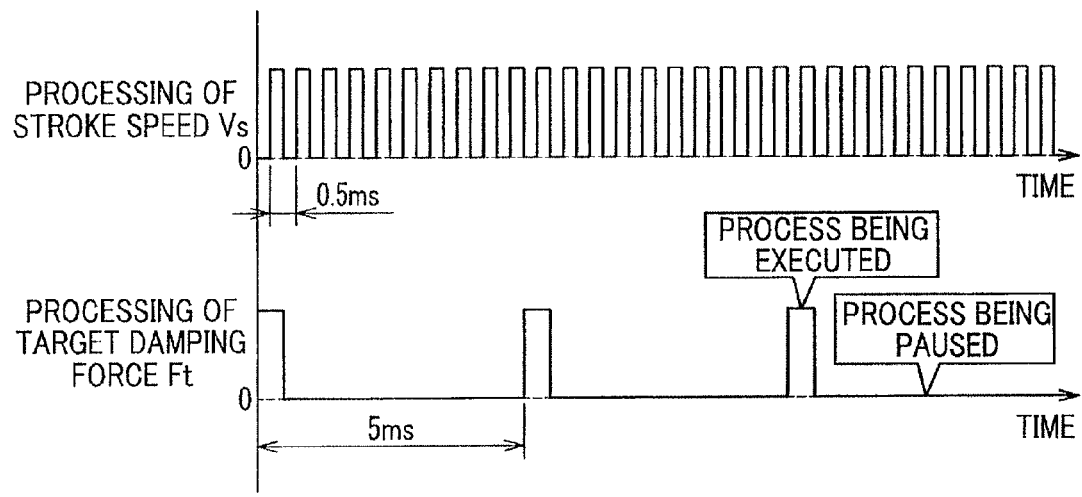
FIG. 10B is a diagram showing time charts of processes by a CPU for the stroke speed, and the target damping force shown in FIG. 10A, respectively.

FIG. 10A is a diagram showing respective changes in the stroke speed Vs, the target damping force Ft, and the target current It all shown in FIG. 9 with respect to an elapsed time, and FIG. 10B is a time chart for processes by the CPU for the stroke speed Vs and for the target damping force Ft shown in FIG. 10A.

At a lowest part 10A for the target current It in the graph of FIG. 10A, as the sign of the stroke speed Vs is negative (−), the sign of the target damping force Ft is positive (+) and both signs are not consistent with each other, the target current It for the coil 28 of the damper 10 is zero.

As shown in FIG. 10B, the process for the stroke speed Vs is repeated at the period of 0.5 ms. In contrast, the process for the target damping force Ft is repeated at a period of 5 ms.

Output values shown in FIG. 10A are set in parallel with the elapsed time, but as shown in FIG. 10B, the CPU itself does not simultaneously progress the plural processes, but changes the process to be executed each time, and as shown in FIG. 10B and FIG. 9, the period for executing a process is set to be a length as needed, so that simultaneous execution of plural processes is suppressed, and thus the load to the CPU is reduced.

For example, as shown in FIG. 10B, as the process for the target damping force Ft is executed at a period of 5 ms, a time during which the process is being paused is longer than a time during which the process is being executed, so that a time when the process for the stroke speed Vs overlaps with the process for the target damping force Ft is short in the CPU, resulting in reduction of the load to the CPU.

Figure 11:
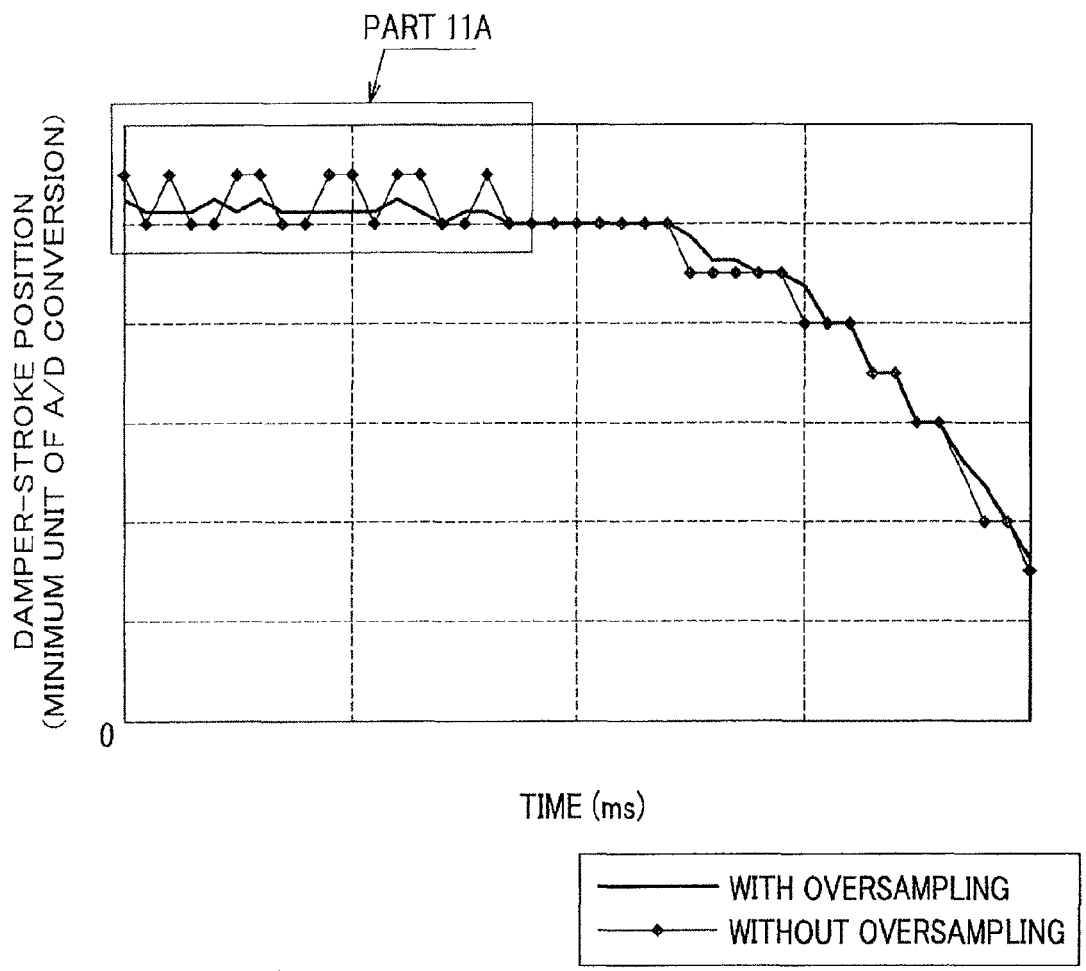
FIG. 11 is a comparison chart for comparing detection results of the damper-stroke position with/without oversampling.

FIG. 11 is a comparison chart for comparing detection results of a damper-stroke position with/without an oversampling.

A part 11A in FIG. 11 is an example representing a region where it is detected as if the damper-stroke position changes due to quantized noises even though the damper-stroke position remains the same as indicated by a thin continuous line in the part 11A without oversampling.

As explained above, in a prior art without oversampling, the damper-stroke position is quantized by the minimum unit of analog/digital voltage conversion by the CPU, and quantized noises (see the thin continuous line in part 11A in FIG. 11) shifted from actual damper-stroke position are generated.

In contrast, according to this embodiment where the damper-stroke position is detected (oversampled) at a period shorter than that of the damper-stroke speed calculating unit 36 and plural detected values are averaged, as is indicated by a thick continuous line in the part 11A, the damper-stroke position can be detected more finely than the minimum unit of analog/digital conversion by the CPU. Accordingly, it is possible to suppress any effect of quantized noises.

Figure 12:
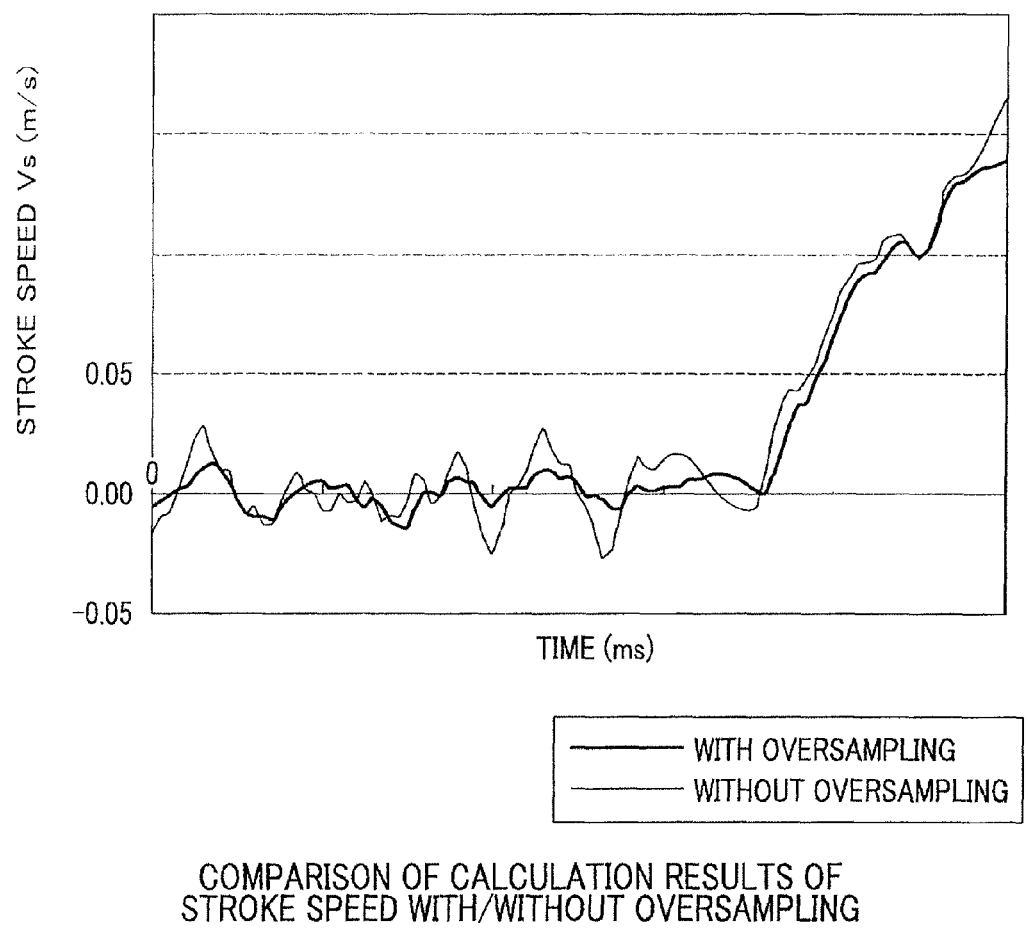
FIG. 12 is a chart for comparing detection results of the stroke speed with/without oversampling.

FIG. 12 is a chart for comparing calculation results of a stroke speed with/without oversampling. The horizontal axis represents a time (ms), and the vertical axis represents a stroke speed Vs (m/s).

As shown in FIG. 12, as the damper-stroke position is detected (oversampled) at a period shorter than that of the damper-stroke speed calculating unit 36 and plural detected values are averaged and subjected to differentiation to obtain the stroke speed Vs, as is indicated by a thick continuous line in the graph of FIG. 12, any effect of quantized noises is suppressed when the stroke speed Vs is around zero. Accordingly, the amplitude of the stroke speed Vs is small. Also, the number of times of changing the sign of the stroke speed Vs is reduced to nine times indicated by the thick continuous line in the graph in comparison with fifteen times indicated by a thin continuous line without oversampling.

Conventionally, when the stroke speed Vs is around zero, the quantized noises cause the amplitude of the actual stroke speed Vs to become large, and cause the number of times of changing the sign to increase (see thin continuous line in the graph of FIG. 12). According to this embodiment, however, such negative effect can be suppressed by oversampling.

<<Operation and Effect>>

According to the above-explained structure, as the processing periods for the vehicle motion detecting unit 40 and the target damping force calculating unit 39 which need to cope with frequency components included in the motion of the vehicle 100 are set to be different (tent times or so) from the processing periods of the target current calculating unit 37 and the damper motion detecting unit 42 which need to cope with frequency components included in the stroke speed Vs, it becomes possible to cope with high frequency components of 10 to 20 Hz included in the stroke speed Vs of the damper 20 without increasing the processing power of the CPU, i.e., the cost thereof.

Also, as the damper-stroke position is detected (oversampled) at a period shorter than that of the damper-stroke speed calculating unit 36, detected values are averaged and the averaged value is subjected to differentiation to obtain the stroke speed Vs of the damper 20, or as the damper stroke position is detected (oversampled) at a period shorter than that of the damper-stroke speed calculating unit 36, detected values are differentiated and averaged to obtain the stroke speed Vs, it is possible to suppress any effect of quantized noises at a region where the sign of the stroke speed Vs changes.

That is, the precision of the stroke speed Vs increases when the stroke speed Vs of the damper 20 is around zero because of oversampling, so that the precision of the target current It at a region where the target current It rapidly changes when the stroke speed Vs is around zero like the parts 8A, 8C in FIG. 8 can be increased, thereby suppressing any effect of quantized noises. This results in precise control of the damping force of the damper 20.

The detection period of a damper-stroke position which is 0.125 ms, the processing periods of the damper motion detecting unit 42 and the target current calculation unit 37 which are 0.5 ms, and the processing period of the target damping force calculating unit 39 which is 5 ms are just examples. The present invention is not limited to such values if respective periods are set to be longer in the foregoing order, i.e., in the order of the detection period of the damper-stroke position, the processing periods of the damper motion detecting unit 42 and the target current calculating unit 37, and the processing period of the target damping force calculating unit 39, and such processing period can be set arbitrary.

What is claimed is:

1. A control device for a damping-force adjustable damper, the control device causing relative vibration between a vehicle body and a wheel to attenuate through outputting of a target output, and the control device comprising:
   a target damping force setting unit which sets a target damping force in accordance with a motional condition of the vehicle body or with a road condition;
   a stroke position detecting unit which detects a stroke position of the damping-force adjustable damper;
   a stroke speed calculating unit which calculates a stroke speed in accordance with a stroke position detected by the stroke position detecting unit;
   a target output calculating unit which calculates a target output value to be output to the damping-force adjustable damper in accordance with the target damping force obtained by the target damping force setting unit and the stroke speed obtained by the stroke speed calculating unit; and
   a processing-period setting unit which individually sets respective processing periods or detection periods of the target damping force setting unit, the stroke position detecting unit, the stroke speed calculating unit, and the target output calculating unit,
   wherein the processing-period setting unit sets respective processing periods of the stroke speed calculating unit and the target output calculating unit in accordance with a resonant frequency of unsprung mass, and sets a processing period of the target damping force setting unit to be longer than respective processing periods of the stroke speed calculating unit and the target output calculating unit in accordance with a resonant frequency of sprung mass,
   wherein the processing-period setting unit sets the detection period of the stroke position of the stroke position detecting unit shorter than a calculating period of the stroke speed calculating unit in a range of the stroke speed around zero where the target output rapidly changes, so that the stroke position detecting unit detects stroke positions for plural times during a period in which the stroke speed calculating unit executes a process, and
   wherein the stroke speed calculating unit calculates a speed output value based on an average value of plural position output values for plural stroke positions detected by the stroke position detecting unit during a period in which the stroke speed calculating unit executes a process.

2. The damping-force-adjustable-damper control device according to claim 1, wherein the processing-period setting unit updates the stroke speed which is output by the damper-stroke speed calculating unit at the same period as that of the target output calculating unit or at a shorter period than that of the target output calculating unit.

3. The damping-force-adjustable-damper control device according to claim 1, wherein a processing period of the target output calculating unit is one-tenth of that of the target damping force setting unit.

4. The damping-force-adjustable-damper control device according to claim 1, wherein processing-period setting unit sets a detection period of the stroke position detecting unit to be the fastest, and sets a processing period of the target damping force setting unit to be the latest respectively in the stroke position detecting unit, the stroke speed calculating unit, the target damping force setting unit, and the target output calculating unit.

5. The damping-force-adjustable-damper control device according to claim 2, wherein the stroke speed calculating unit calculates a speed output value from an average value of plural speed values obtained by performing time-differentiation on plural position output values for plural stroke positions detected by the stroke position detecting unit during a period in which the stroke speed calculating unit executes a process.

6. A control device for a damping-force adjustable damper, the control device causing relative vibration between a vehicle body and a wheel to attenuate through outputting of a target output, and the control device comprising:
   a target damping force setting unit which sets a target damping force in accordance with a motional condition of the vehicle body or with a road condition;
   a stroke position detecting unit which detects a stroke position of the damping-force adjustable damper;
   a stroke speed calculating unit which calculates a stroke speed in accordance with a stroke position detected by the stroke position detecting unit;
   a target output calculating unit which calculates a target output value to be output to the damping-force adjustable damper in accordance with the target damping force obtained by the target damping force setting unit and the stroke speed obtained by the stroke speed calculating unit; and
   a processing-period setting unit which individually sets respective processing periods or detection periods of the target damping force setting unit, the stroke position detecting unit, the stroke speed calculating unit, and the target output calculating unit,
   wherein the processing-period setting unit sets respective processing periods of the stroke speed calculating unit and the target output calculating unit in accordance with a resonant frequency of unsprung mass, and sets a processing period of the target damping force setting unit to be longer than respective processing periods of the stroke speed calculating unit and the target output calculating unit in accordance with a resonant frequency of sprung mass,
   wherein the processing-period setting unit sets the detection period of the stroke position of the stroke position detecting unit shorter than a calculating period of the stroke speed calculating unit in a range of the stroke speed around zero where the target output rapidly changes, so that the stroke position detecting unit detects stroke positions for plural times during a period in which the stroke speed calculating unit executes a process, and
   wherein the stroke speed calculating unit calculates a speed output value from an average value of plural speed values obtained by performing time-differentiation on plural position output values for plural stroke positions detected by the stroke position detecting unit during a period in which the stroke speed calculating unit executes a process.

* * * * *